Figure 1:
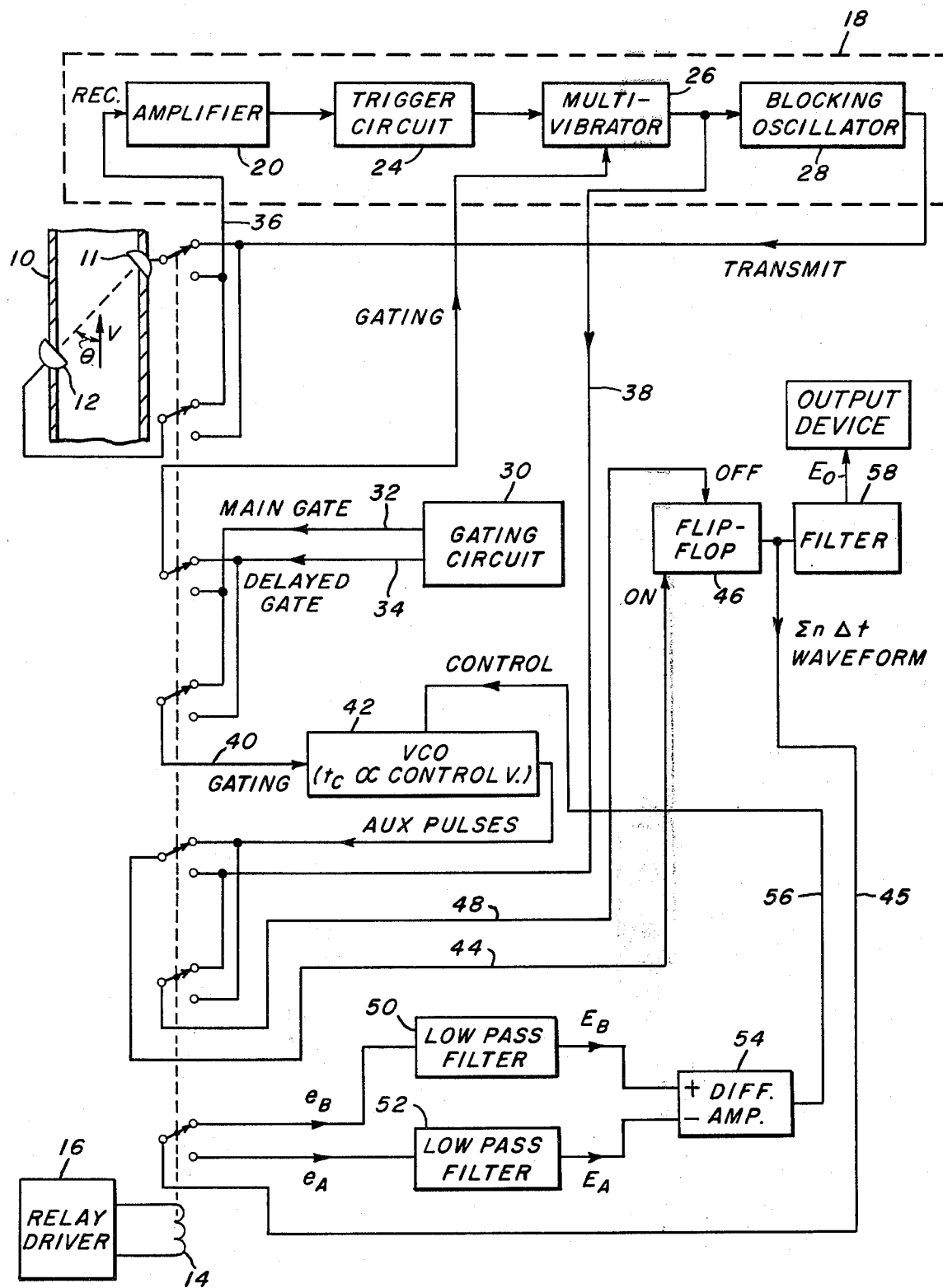

United States Patent [19]
McShane

[11] 3,914,998
[45] Oct. 28, 1975

[54] ULTRASONIC FLOWMETER SYSTEM WITH ALTERNATING TWO-WAY TRANSMISSION

[75] Inventor: James L. McShane, Pittsburgh, Pa.

[73] Assignee: Westinghouse Electric Corporation, Pittsburgh, Pa.

[22] Filed: Jan. 3, 1974

[21] Appl. No.: 430,451

[52] U.S. Cl. ................................................. 73/194 A
[51] Int. Cl.² .............................................. G01F 1/66
[58] Field of Search ......... 73/194 A; 324/79 R, 79 D

[56] References Cited
UNITED STATES PATENTS

| | | | |
|---|---|---|---|
| 3,235,800 | 2/1966 | Turrell | 324/79 R |
| 3,237,453 | 3/1966 | Yamamoto et al. | 73/194 A |
| 3,653,259 | 4/1972 | McShane | 73/194 A |
| 3,720,105 | 3/1973 | Cirulis | 73/194 A |

FOREIGN PATENTS OR APPLICATIONS

| | | | |
|---|---|---|---|
| 248,269 | 12/1969 | U.S.S.R. | 73/194 A |

Primary Examiner—Charles A. Ruehl
Attorney, Agent, or Firm—C. M. Lorin

[57] ABSTRACT

A two-transducer ultrasonic flowmeter system in which trains of pulses are alternately transmitted upstream and downstream and in which the transmission direction is reversed at a relatively slow rate. Each transducer acts only as a transmitter or a receiver during each interval of upstream or downstream transmission, the result being that the "ringing problem" encountered with certain prior art ultrasonic flowmeter systems is eliminated.

4 Claims, 2 Drawing Figures

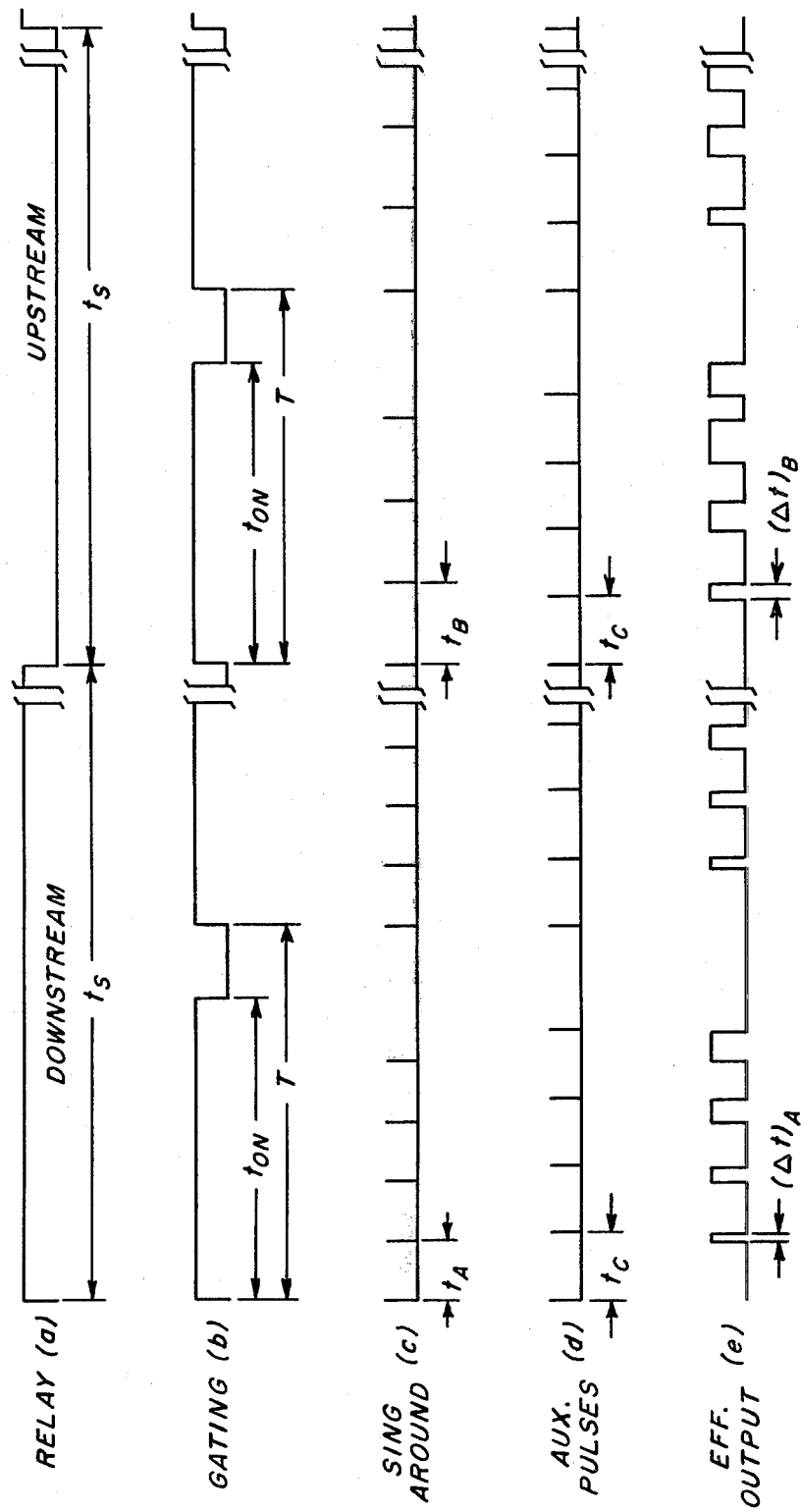

ULTRASONIC FLOWMETER SYSTEM WITH ALTERNATING TWO-WAY TRANSMISSION

BACKGROUND OF THE INVENTION

The usual principle of ultrasonic flowmeters involves the transmission of ultrasonic waves through a fluid medium in two directions, one upstream and the other downstream of the direction of flow, and comparing the transit times, normally over paths of equal lengths. Assuming that the speed of sound remains constant, the speed of propagation of the waves in the fluid medium is the same over both paths; and the transit time varies according to the flow velocity of the fluid medium which shortens the transit time over the downstream path and lengthens the transit time over the upstream path. From the difference between the upstream and downstream transit times, the flow velocity of the liquid medium can be calculated by a time difference technique. The use of a single acoustic path has the advantage of avoiding differences, not caused by flow, between paths.

The basic theory of the time difference technique can be explained as follows: Assume, for example, that a conduit having a uniform flow of fluid velocity, $v$, contains two sets of transducers facing each other at a spacing, $d$, between the two, and with the acoustic path forming an angle $\Theta$ with the conduit axis. If the sound velocity in the fluid at rest is $c$, then the respective transit times downstream, $t_A$, and upstream, $t_B$, can be represented as follows:

$$(1) \quad t_A = \frac{d}{c + v_p}$$

and $$(2) \quad t_B = \frac{d}{c - v_p}$$

where $v_p$ is the velocity component in the direction of the acoustic path, i.e, $v_p = V \cos \Theta$. If a pulse is simultaneously transmitted in both paths, the received signals arrive at times differing by:

$$(3) \quad \Delta t = t_B - t_A = \frac{2dv_p}{c^2 - v_p^2}$$

The velocity of the fluid, $v$, and hence also $v_p$, is much smaller than the sound velocity, $c$, in the fluid at rest for all practical applications in liquids. For these applications, the approximate equation:

$$(4) \quad \Delta t = \frac{2dv_p}{c^2}$$

is sufficiently accurate. Thus, $\Delta t$ is proportional to $V_p$ with the calibration constant being a function of $c$, and $v_p$ can be determined from the relationship:

$$(5) \quad v_p = \frac{c^2 \Delta t}{2d}$$

In U.S. Pat. No. 3,653,259, issued Apr. 4, 1972, an ultrasonic flowmeter system based on a time difference technique is described wherein the time delay between acoustic pulses transmitted upstream and downstream in a fluid passing along a path of travel is multiplied by repeated transmissions in sing-around fashion. This has the advantage of obviating the necessity for measuring very small differences between upstream and downstream transmissions to determine velocity, because of the cumulative effect of combining the time delays between upstream and downstream pulses over a period of time.

It is preferable, in the system of U.S. Pat. No. 3,653,259, to utilize a single pair of transducers, one upstream and the other downstream with two sing-around circuits. In this manner, each transducer must act both as a transmitter and a receiver. That is, each transducer must be capable of serving as a receiver shortly after transmitting. The recovery time allowed is a small fraction of the acoustic travel time, a typical recovery time requirement being 10 microseconds for a 3 inch or 4 inch pipe flowmeter for water. With certain types of ultrasonic flowmeter transducers, especially those with metal acoustic windows, difficulty has been experienced in achieving sufficiently fast decay of the ringing signal (internal reverberation) following a transmit pulse to meet this requirement. The problem becomes worse for fluids which strongly attenuate ultrasonic waves because the received signal is decreased while the ringing signal remains constant.

SUMMARY OF THE INVENTION

In accordance with the present invention, the problems encountered in a multiple time difference ultrasonic flowmeter due to ringing in transducers which serve as both receivers and transmitters are overcome by alternating the direction of transmission of successive trains of ultrasonic pulses. In this manner, a number of pulses initially will be transmitted upstream for a given time interval, followed by transmission of pulses downstream for an equal interval; whereupon the process is repeated. The output from a multiple time difference ultrasonic flowmeter of this type is dependent upon comparison of two pulse trains of differing periods, which normally are the upstream and downstream sing-around pulse trains. Since only one of these pulse trains is present at a given time in the invention described herein, an auxiliary pulse train is generated and compared separately with the upstream and downstream sing-around pulse trains to derive two signals which can be added to obtain flow rate.

Specifically, in accordance with the invention, there is provided a pair of oppositely-disposed ultrasonic transducers in acoustic contact with a fluid stream and located so that the acoustic path is aligned with a substantial component of the fluid stream. A feedback path couples the output of one of the tranducers to the input of the other transducer whereby signals transmitted from one transducer to the other will be recirculated back to the one transducer through the feedback path to produce a train of unidirectional pulses passing through the fluid stream. Switch means are provided for reversing the connection of the respective transducers to the feedback path whereby trains of unidirectional pulses can be transmitted downstream from one transducer with the switch means in one state and upstream from the other transducer with the switch means in the other state. Additionally, means are provided for generating a source of auxiliary pulses in which the time interval between pulses is constant, or essentially constant. By generating a first signal proportional to the cumulative time difference between auxiliary pulses and recirculated pulses with the switch means in one state, and by generating a second signal proportional to the cumulative time difference between auxiliary pulses and recirculated pulses with the switch means in the other state, the first and second signals can be added to derive an output signal proportional to the rate of flow of fluid in the fluid stream in which the transducers are disposed.

The above and other objects and features of the invention will become apparent from the following detailed description taken in connection with the accompanying drawings which form a part of this specification, and in which:

FIG. 1 is a block schematic diagram of one embodiment of the invention; and

FIG. 2 comprises waveforms illustrating the operation of the system of FIG. 1.

With reference now to the drawings, and particularly to FIG. 1, a conduit 10 is shown having a fluid flowing therethrough in the direction of arrow V at a velocity $v$. Disposed in the walls of the conduit 10, and in acoustic contact with the fluid therein, are two spaced ultrasonic transducers 11 and 12 which face each other. Ultrasonic pulses transmitted from transducer 12 downstream to transducer 11 have a speed equal to $(c + v_p)$ where $c$ is the sound velocity in the fluid at rest and $v_p$, as mentioned above, is equal to $v \cos \Theta$ where $v$ is the velocity of fluid flowing through the conduit and $\Theta$ is the angle between the conduit axis and the acoustic path. If transducers are aligned with the flow, as they could be in a conduit or in a free-flow field, $\Theta = 0$, and $v_p = v$. On the other hand, when pulses are transmitted from transducer 11 to transducer 12, the velocity of the wave energy is $(c - v_p)$.

The system shown in FIG. 1 includes a relay 14 driven by a driver 16 which acts to energize the relay 14 for a given interval of time, thereafter deenergizes the relay for an equal interval of time, again energizes it for an equal interval of time, and so on. In FIG. 2, waveform ($a$) illustrates the output waveform of the relay driver 16, the equal ON and OFF periods being identified as $t_s$. The relay 14 has a number of contacts, the functions of which will hereinafter be described.

The sing-around circuit of the invention is enclosed by broken lines and identified by the reference numeral 18 in FIG. 1. It includes an amplifier 20 having its input connected to receive pulses. The output of amplifier 20 causes trigger circuit 24 to produce a trigger pulse at a predetermined portion of each received ultrasonic pulse (i.e., burst of ultrasonic oscillations), particularly the leading edge of the first or second half cycle. This trigger signal causes astable multivibrator 26 to change states; and the resulting multivibrator output triggers blocking oscillator 28 to produce a narrow pulse which is applied to the transmitting transducer 11 or 12, as the case may be, thus completing the regenerative sing-around action.

The operation of the circuit of FIG. 1 can best be understood by reference to FIG. 2. The gating circuit 30 in FIG. 1 produces two gating signals, one of which appears on lead 32 and the other of which appears on lead 34 and is delayed by an amount $\tau$ with respect to that on lead 32. The purpose of delayed pulses on lead 34 is to prevent coincidence between sing-around pulses and auxiliary pulses in the early portion of each train. This will be explained hereinafter.

The gating waveform ($b$) in FIG. 2 shows the interval $t_{ON}$ during which the sing-around, auxiliary pulse, and readout circuits are activated, with reactivation occurring repetitively with the period T. Direction switching by the relay 14 occurs at a rate slow enough so that many $t_{ON}$ intervals occur during each interval $t_s$ of upstream or downstream transmission. Thus, a large fraction of the total time is represented by the breaks in the waveforms of FIG. 2. Also many more sing-around repetitions occur during $t_{ON}$ than are shown in FIG. 2.

When the gating pulse of waveform ($b$) is initially applied to multivibrator 26, the multivibrator is activated to excite blocking oscillator 28 which shock excites transducer 11 and thus causes a burst of ultrasonic oscillations to be transmitted from transducer 11 to transducer 12 for upstream transmission as shown by the switch position in FIG. 1. The burst of oscillations received by transducer 12 is amplified in amplifier 20 via lead 36; and the output of the amplifier 20 is used to excite trigger circuit 24 which again actuates the multivibrator 26 to transmit a second pulse. The result is a series of sing-around pulses illustrated as waveform ($c$) in FIG. 2 and having the period $t_B$ for upstream transmission. At the same time, the pulses from gating circuit 30 are applied via leads 32 and 40 to a voltage controlled oscillator (VCO) 42. This actuates the VCO 42 which produces a series of auxiliary pulses illustrated as waveform ($d$) in FIG. 2. The period $t_C$, during downstream transmissions, is always greater than the period $t_A$. The auxiliary pulses, in the case of upstream transmission, are applied via lead 44 to a readout circuit comprising a flip-flop circuit 46. The other input to the flip-flop circuit is connected via lead 48 and through contacts on relay 14 for the upstream case to lead 38 on which appears the sing-around pulses in waveform ($c$). The result is the right-hand part of waveform ($e$) appearing in the output of the flip-flop 46. As can be seen, the cumulative width of the pulses during the period $t_{ON}$ in waveform ($e$) is proportional to the cumulative time difference between the pulses in waveform ($c$) and those in waveform ($d$).

The operation of the system is the same for downstream operation except that the relay contacts of FIG. 1 are now reversed so that the delayed gate signal on lead 34 is applied to the VCO 42 while the undelayed gate signal is applied to the multivibrator 26. This causes the pulses in waveform ($c$) to lead the auxiliary pulses in waveform ($d$), resulting again in waveform ($e$) at the output of flip-flop 46.

Waveform ($e$) shows the effective output pulses, the term "effective" meaning that the constant portion, equal to initial delay $\tau$, of each output pulse is not shown because it does not contribute to the final output. However, in an actual installation, the auxiliary pulses or the sing-around pulses may be delayed by virtue of the delayed gate pulses on lead 34 such as to avoid coincidence between the first pulses in waveforms ($c$) and ($d$). During the downstream interval shown in FIG. 2, the output pulses from flip-flop 46 are started by sing-around pulses and ended by auxiliary pulses; whereas during upstream transmission, the role of the two pulse trains is reversed. If delay $\tau$ is introduced between pulse trains that produce the output, a waveform consisting of pulses of fixed width $\tau$ can be used to derive a voltage which is subtracted from the averaged flip-flop output to provide correct effective output, as in the system of U.S. Pat. No. 3,653,259.

For the readout system to function, the time period $t_C$ must be intermediate to $t_A$ and $t_B$. In order to maintain $t_C$ in the correct range under conditions of changing sound velocity, it may be necessary to control the frequency of the VCO 42 whose period is $t_C$. In this respect, the waveform ($e$) at the output of flip-flop 46 is applied through lead 45 and contacts of relay 14 to either of the low-pass filters 50 or 52, the outputs of which are applied to a differential amplifier 54. Differential amplifier 54, in turn, provides on lead 56 a control voltage for the VCO 42. In the example given, ($\Delta t)_B$ is greater than $(\Delta t)_A$. Note that this is shown in FIG. 2. A control signal, therefore, is generated to cause $t_C$ to increase until $(\Delta t)_B$ becomes substantially equal to $(\Delta at)_A$ so that the respective output voltages $E_A$ and $E_B$ for upstream and downstream travel are the same and $t_C$ has become substantially equal to the nominal travel time, e.g. the travel time in the fluid at rest. The output of the flip-flop 46 is also applied to a low-pass filter 58 for the total output $E_O$, comprising both the upstream and downstream signals.

If $t_B$ and $t_A$ are the upstream and downstream sing-around periods, and $t_C$ is the period of the auxiliary pulse train, the time differences during upstream and downstream transmission intervals are:

6. $(\Delta t)_B = t_B - t_C$
7. $(\Delta t)_A = t_C - t_A$

The total time difference, therefore, is:

8. $\Delta t = (\Delta t)_B + (\Delta t)_A = t_B - t_A$

Thus, the sum of the individual time differences is the desired quantity $t_B - t_A$, independently of $t_C$.

Sound velocity correction in the system of the invention comes about because the sing-around loops operate for a fixed time interval. The output can be shown to be proportional to $\Delta t/(t_A t_B)$ and hence to the fluid velocity component, $v_p$, along the acoustic path. The upstream and downstream contributions, $E_B$ and $E_A$, of the output in the proposed system are, therefore:

$$(9) \quad E_B = \frac{Kd}{2} \frac{(\Delta t)_B}{t_B t_C}$$

and $$(10) \quad E_A = \frac{Kd}{2} \frac{(\Delta t)_A}{t_A t_C}$$

The total output, $E_O$, is:

$$(11) \quad E_O = E_B + E_A = \frac{Kd}{2} \frac{(\Delta t)_B t_A + (\Delta t)_A t_B}{t_A t_B t_C}$$

$$(12) \quad = \frac{Kd}{2} \frac{(t_B - t_C) t_A + (t_C - t_A) t_B}{t_A t_B t_C}$$

$$(13) \quad = \frac{Kd}{2} \frac{\Delta t}{t_A t_B} = K v_p$$

where K is a constant and $d$ is the transducer spacing. Thus, fluid velocity component, $v_p$ and hence $v$, are proportional to $E_B + E_A$ (the sum of the upstream and downstream pulses in waveform E) independently of variations in sound velocity due to temperature variations and other factors.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. In a flowmeter operative with a fluid stream, the combination of:

one pair of oppositely disposed first and second ultrasonic transducers located in acoustic contact with said fluid stream and being at an angle in relation to said fluid stream;

transducer triggering means operative in a sing-around fashion with said first and second transducers to transmit acoustic signals from each one of said transducers in response to an acoustic signal received from the other transducer;

switching means having two opposite operative positions for connecting said transducers to said transducer triggering means alternately in a direct and in a criss-cross connection thereby to exchange the transmitting and receiving functions of said transducers;

gating means operative with said transducer triggering means for enabling the generation from said transducers of a train of downstream electrical pulses having the pulse spacing characteristic of said downstream sing-around operation when said switching means is in one operative position corresponding to downstream operation of said transducers, and said gating means establishing successive predetermined equal time intervals for said generation of downstream pulses;

said gating means being operative with said transducer triggering means for enabling the generation from said transducers of a train of upstream electrical pulses having the pulse spacing characteristic of said upstream sing-around operation when said switching means is in the other operative position corresponding to upstream operation of said transducers, and said gating means establishing successive predetermined equal time intervals for said generation of upstream pulses;

means enabled by said gating means during successive predetermined equal time intervals and operative for each position of said switching means for generating reference pulses having a constant spacing larger than said downstream pulse spacing and smaller than said upstream pulse spacing;

means cumulatively responsive to the time difference between each pulse belonging to one of said trains of downstream and upstream pulses and each corresponding one of said reference pulses for each of the operative positions of said switching means for deriving respective sum signals each dependent upon the speed of sound in said fluid at rest and proportional to the cumulative time difference between the reference pulse and the corresponding one of said downstream and upstream pulses; and output means operative with said sum signals for deriving a signal representative of fluid velocity.

2. The flowmeter of claim 1, with means responsive to said sum signals for comparing the differences between the respective said upstream and downstream pulse spacings and said constant spacing and means responsive to said comparing means operative with said reference pulse generating means for automatically adjusting said constant spacing to be larger than one and smaller than the other of said upstream and downstream spacings.

3. The flowmeter of claim 2, with said reference pulse generating means comprising a variable frequency voltage controlled oscillator, said oscillator being controlled by said comparing means and gated by said gating means.

4. The flowmeter of claim 3, with said comparing means comprising differential means sequentially responsive to said sum signals for supplying a control voltage to said variable frequency oscillator.

* * * * *